ated Jan. 6, 1970

3,488,718
FILTRATION OF HYDROUS OXIDES

William B. Innes, Stamford, Conn., and Emerson V. Paul, Baldwin, N.Y., assignors to American Cyanamid Company, Stamford, Conn., a corporation of Maine
No Drawing. Continuation-in-part of application Ser. No. 182,613, Mar. 26, 1962. This application Dec. 16, 1963, Ser. No. 330,591
Int. Cl. C02c 5/02; C02b 1/16; B01i 1/04
U.S. Cl. 210—54                              6 Claims

ABSTRACT OF THE DISCLOSURE

The filtering and washing characteristics of substantially pure synthetic hydrous oxides capable of adsorbing anionic materials, such as alumina gel, silica-alumina gel, ferric oxide, or basic nickel carbonate, from aqueous suspensions are improved by adding about 0.01% to 0.5% by weight of solids of a water-soluble polyelectrolyte having the structure, in acid form:

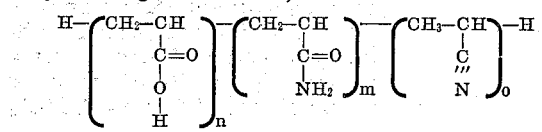

where $n$, $m$ and $o$ are whole numbers, and $n$ is always greater than zero, to the aqueous suspension at a pH of about 4 to 10.

---

Cross reference to related applications

This application is a continuation-in-part of our application Ser. No. 182,613, filed Mar. 26, 1962, which is a continuation-in-part of our application Ser. No. 304,444, filed Aug. 14, 1952, both now abandoned.

This invention relates to flocculating agents and filter aids for use in the handling of finely-divided solids and colloidal materials. More particularly, this invention is concerned with flocculation agents and filtration aids for handling hydrous oxides such as alumina gel, silica-alumina gel, ferric oxide, and basic nickel carbonate.

In the filtering of finely-divided solids and colloidal materials, difficulties are frequently encountered when these ultrafine solids or materials are deposited on the filter media and plug or blind the pores of the same. The permeability of the filter media is consequently decreased and the filtration and washing rates are seriously lowered due to the resulting increased resistance to flow. Additionally, the filter cake itself which is deposited as a layer of solid particles on the surface of the filter media adds to the resistance to flow, particularly if the particles are of very fine size and tend to pack together very closely.

In the filtering of colloidal or gelatinous materials, such as hydrated alumina or silica-alumina slurries, resort has been to various flocculating agents which have been added to these slurries to improve the filtering and washing characteristics thereof. Adhesive colloids such as glue, gelatin, gluten and gluten-containing materials, such as wheat flour and the like, have been used in amounts of 0.001% to 0.1% based on the weight of the slurry and have been found to be reasonably successful in improving filtering and washing characteristics. However, considerable room for improvement still exists and this is particularly so in the case of the fine colloidal materials.

We have found that the filtering and washing of finely-divided solids and colloidal materials capable of adsorbing anionic materials may be considerably improved by adding thereto, prior to filtering and washing, a small amount of a flocculating agent and filtration aid comprising polyacrylic acid and/or hydrolyzed polyacrylonitrile and soluble salts thereof.

Acrylonitrile, $CH_2=CHCN$, when polymerized has the formula

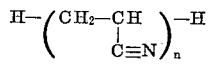

assuming the polymerization is stopped by some conventional chain terminating mechanism. This is hydrolyzed to

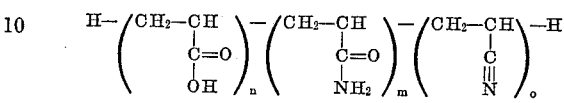

where $n$, $m$ and $o$ are whole numbers, and the groups within the parentheses occur in random order and orientation. For most hydrolysis, $o$ is comparatively small, and may be effectively zero. Where complete hydrolysis occurs, $m$ is also effectively zero, and the product is effectively the same as polyacrylic acid. Usually at least some amide groups remain, so that the same polymers can be produced by the copolymerization of acrylamide and acrylic acid, or the hydrolysis of polymerized acrylonitrile. Frequently acrylamide is produced by the partial hydrolysis of acrylonitrile, so that the order of polymerization and hydrolysis can account for a different name for the same polymer. With molecular weights of 25,000 and higher, the sum of $n$ and $m$ must be fairly large, and under any conventional conditions, $n$ is greater than zero, so that the polymer has at least some acid groups. After polymerization the groups can be named, carboxyethylene, carbamylethylene, and nitriloethylene respectively. The carboxy group can exist as the ionized form in aqueous solution, or as an alkali salt, such as the sodium salt. The form added is a matter of choice, depending on manufacturing convenience. In the filtration operations the ionized form obviously results. With some gels used as catalysts, the ammonium salt, or acid form is much preferred to reduce the metallic ion concentration in the final product. With some other catalysts, and some other systems, the quantity of metallic ion is not critical.

As used elsewhere in this application, the polymer is at times referred to by its chemically correct name, or formula, or as a polymer of a starting material, as is presently more conventional in casual discussions by users of this invention, based largely on historical precedent.

Polyacrylic acid could more properly be termed polycarboxyethylene, whereas a hydrolyzed polyacrylonitrile is essentially a polycarbamylethylene polycarboxyethylene polyelectrolyte. The residual polynitriloethylene linkages are usually minimal, and is not important from the present standpoint. A minor proportion of linkages from other vinyl compounds are frequently present in commercial preparations, and do no harm. Sometimes highly refined techniques are required to detect such minor proportions.

Within the broader aspects of the present invention, we have found that polyacrylic acid or polycarboxyethylene and hydrolyzed polyacrylonitrile and mixtures, or polycarbamylethylene polycarboxyethylene polyelectrolyte, thereof constitute the preferred embodiment of our inventive concept and will be employed as illustrative thereof. However, such it not to be construed as limitative of the invention which covers broadly a class of materials including the water-soluble or water-dispersible polymers of unsaturated aliphatic monocarboxylic acids such as acrylic acid, methacrylic acid, etc., as well as the hydrolyzed and/or saponified polymers of their acid-forming derivatives, i.e., the corresponding amides, nitriles and esters. The same polyelectrolyte can be prepared from different starting monomers.

The addition of extremely small amounts of polyacrylic acid and/or hydrolyzed polyacrylonitrile has been found to prevent plugging and blinding of the pores of the filter media to a considerable extent and to increase the filter cake permeability very markedly to thus enable a great increase in the filtration and washing rate. For example, improved effects have been observed as a result of the addition of quantities as small as 0.01%, as computed on a solids basis. For the purposes of this invention, however, the amounts of the improving agents to be added are preferably from about 0.05% to about 0.5% on solids basis. Higher amounts, up to 2.0% or more on solids basis may be used with improved results but the increased costs of such additions militate against such use.

As used herein, the term "percent on solids basis" of filter aid or flocculating agent means the percent thereof, as calculated on a dry basis, with respect to the finely-divided material in the solution, also calculated on a dry basis. For example, "0.3% polyacrylic acid on solids basis" covers the use of 0.3 pound of dry polyacrylic acid in a suspension containing 100 pounds of finely-divided material, also calculated on a dry basis.

The degree of polymerization of the additives of the present invention is important and it has been established that a molecular weight of at least 25,000 should be employed. Additives having lower molecular weights have been used and have generally improved the filtration and washing rates, but for the purposes of the present invention, additives with molecular weights at least equal to the value above-mentioned are preferred.

Without being bound to any particular theory regarding the mechanism of the flocculating action involved, it is believed that the long chain polymeric anionic molecules are adsorbed on both of two neighboring gel particles at the same time and thus act to "tie" them together and give structure to the mass. The material is thus drawn into a loose "flocculated," less-compressible and more permeable filter cake. This is evidenced partially by the fact that the viscosity of the slurry is markedly increased and the solids content of the filter cake is decreased slightly. At the same time, these tied-together particles are less capable of wedging into the pores of the filter media and thus show a decreased tendency to plug or blind the same.

Theoretically therefore, it would appear that there are no operative upper limits of the degree of polymerization or the molecular weights of the additives of the present invention, inasmuch as the longer the linking molecule is, and the higher its molecular weight, the greater is the flocculating effect. Actually, however, the practical upper limits are determined by factors of availability, cost of production, and other economic considerations.

While the above limit is the result of the best approximate measurements of actual molecular weight possible at the present time, it is realized that uncertainty still exists as to the accuracy of the molecular weight determination of such polymers. Accordingly, it is preferable to define the measurement of the degree of polymerization more specifically. To illustrate this, let us consider hydrolyzed polyacrylonitrile. In the case of hydrolyzed polyacrylonitrile, it has been found preferable to define such as measurement in terms of the specific viscosity of the acrylonitrile polymer prior to hydrolysis. This value is obtained from viscosity measurements of a solution of 1 gram of the polyacrylonitrile polymer made up to 100 ml. with any suitable solvent, such as dimethylformamide, and subsequent calculation from the following equation:

$$N_{sp} = \text{Specific viscosity} = \frac{\text{viscosity of solution}}{\text{viscosity of solvent}} - 1$$

From this, the molecular weight may be calculated by the Staudinger equation:

$$\text{Molecular weight} = \frac{N_{sp}}{K_m C}$$

wherein:

$$K_m = 1.5 \times 10^{-4}$$

and C = concentration of the solution expressed as number of mols of the monomer (calculated) per liter of solution.

Specific viscosities of 0.7, 1.5 and 4.5 respectively correspond approximately to molecular weights of 25,000, 53,000 and 159,000 for acrylonitrile polymers according to the best available present information. During hydrolysis or saponification, such as with sodium hydroxide, it is probable that an average of about 70–75% of the nitrile radicals are converted into —COONa groups with much or all of the balance of the nitrile groups being converted into amido radicals. There is no reason to believe that any polymerization or polymer degradation occurs during this reaction; accordingly, the acrylonitrile polymers of 0.7, 1.5 and 4.5 specific viscosities are convertible into or are equivalent to hydrolyzed polyacrylonitriles having a molecular weight of about 41,000, 88,000 and about 264,000 respectively as may easily be computed after assuming the conversion of approximately 70–75% of the nitrile groups into —COONa radicals and 25% into —CONH₂ groups.

In the case of polyacrylic acid, specific viscosities are determined directly on solutions thereof, inasmuch as no hydrolysis considerations are present, and the above-mentioned formulae are applied.

However, such polymerization and their controls are well known and form no part of the present invention, and therefore they are not described to any great detail herein. It will, of course, be realized that all of the polyacrylic compounds discussed herein are actually mixtures of polymers of various degrees of polymerization and that the stated molecular weights are averages for the mixtures.

The polyacrylic acid and/or the hydrolyzed polyacrylonitrile is simply added in the calculated amounts to the slurry which is to be filtered and washed and is mixed uniformly thereinto with gentle agitation by a mixing device such as by a paddle wheel stirrer. It is preferable that the filtering and washing take place as soon thereafterwards as possible, inasmuch as some lowering of effectiveness as a flocculating agent and filtration aid is observed, if such processes are delayed for too long a time and if the agitation is too vigorous. It is believed that the effect of a delay in time accompanied by too vigorous agitation can be theoretically explained on the basis that the polyacrylic acid and/or the hydrolyzed polyacrylonitrile are believed to be capable of slowly diffusing into the interior of the gel particles whereby they lose their effectiveness of flocculating agents and filtration aids.

The effectiveness of the additives of the present invention appears to be considerably enhanced if the pH of the slurry being filtered and washed is maintained within the range of 4 to 10. Below that range, the polyacrylic acid is no longer anionic and loses a part of its ability to be adsorbed simultaneously to two adjacent particles of material to flocculate or tie them together. In other words, it may be stated that polyacrylic acid is too weak an acid and is thus ineffective at low pH values. On the other hand, when the pH values rise to above 10 or 11, the effectiveness of the polyacrylic acid is again lessened but this time such loss of effectiveness is considered due to the interference or competition of the hydroxyl ions at such pH values. For the purposes of this invention, therefore, the preferred pH values may be stated as lying in the range pH 4–10, with the optimum effectiveness of the additives being observed at a pH of 6.5–7.0.

As a conquence of such anionic characteristics, the additives of the present invention are intended to be used primarily with materials which are capable of adsorbing anionic materials. The additives, therefore, have excellent application in the manufacture of silica-alumina catalyst and in the filtration of hydrous alumina which is used for catalyst and "lake" purposes. Other hydrous oxides, such as ferric oxide, and other materials such as basic nickel carbonate, also find applicability within the principles of the present invention.

The results of the following tests set forth in Table I indicate the improved filtering and washing characteristics obtained by adding polyacrylic acid to a silica-alumina slurry.

TABLE I

| Additive | Percent Solids basis | pH | Slurry Viscosity | Permeability Pick-up | Constant Wash |
|---|---|---|---|---|---|
| Blank (Control) | | 6.8 | 2.1 | 8 | 71 |
| Do | | 6.5 | 2.1 | 79 | 74 |
| Polyacrylic acid | 0.1 | 6.5 | 3.3 | 244 | 195 |
| Do | 0.3 | 6.5 | 20.0 | 625 | 332 |

The improved filtration characteristics of such silica-alumina slurries may be best represented to a large extent by a single parameter, namely, the cake permeability constant, $k$, which may be expressed by the formula:

$$k = \frac{M_c M_f}{2 t_f} = \frac{M_c M_w}{t_w}$$

where:
$M_c$ = mass of cake (.1 sq. ft. leaf)
$M_w$ = mass of wash (.1 sq. ft. leaf)
$M_f$ = mass of filtrate
$t_f$ = pick-up time in seconds per cycle
$t_w$ = time of wash in seconds In this way, leaf tests can be used to determine the cake permeability constant, $k$, and the necessary values can be calculated both from pick-up and wash data. The values of $k$, the cake permeability constant, are expressed in the above-noted Table I. Consideration of this table also indicates the direct relationship between the viscosity of the slurry and the improvement as indicated by the cake permeability constant.

The following tests on slurry viscosities were, therefore, run as an indication of the improvement resulting from the addition of the indicated additive.

TABLE II

| Additive | Percent Amount (Ignited Basis) | Relative Kinematic Viscosity |
|---|---|---|
| Blank | 0.0 | 1.9 |
| Methocel (15 cps.) | 0.3 | 1.9 |
| Polyvinyl alcohol (med. viscosity) | 0.3 | 1.9 |
| Hydrolyzed polyacrylonitrile (17,000 MW, low viscosity) | 0.3 | 2.6 |
| Hydrolyzed polyacrylonitrile (50,000 MW, med. viscosity) | 0.3 | 7.0 |
| Polyacrylic acid (>80,000 MW, high viscosity) | 0.3 | 23.0 |

Such results indirectly indicate the improvement to be expected in the filtering and washing characteristics inasmuch as the higher viscosity products have been shown to be more effective than the lower viscosity products.

The adsorption of the polyacrylic acid and/or polyacrylonitrile to the material to be filtered and washed did not create any removal or separation problems after filtration and washing and could be easily removed such as by burning-off or calcining. Samples of dried filter cake from the leaf tests were employed to illustrate this. The first sample was a blank with no additive and the second sample contained 0.3% polyacrylic acid. These samples were placed in a muffle furnace, the temperature of which was raised from 450° to 1100° F. in 90 minutes. At 515° F. both samples turned yellow; at 950° F. the black turned white; and at 1000° F., the treated sample turned white.

Although we have used polyacrylic acid and hydrolyzed polyacrylonitrile as the preferred embodiments of our inventive concept, it is, of course, to be realized that other water-soluble or water-dispersible polymers of unsaturated aliphatic monocarboxylic acids, or the hydrolyzed polymers of their acid-forming derivatives, may be employed. These polymers have molecular weights in excess of 25,000 and also follow the general rule that the higher the molecular weight thereof, or the greater the degree of polymerization, then the more advantageous is their use. The concentrations of their applicable use fall generally within the ranges set forth herein with improved results being observed at concentrations as low as 0.01%, with the upper limits being defined by cost, availability and other economic factors.

The term "substantially pure" in the claims distinguishes over any process in which other components are present in substantial amounts.

Although we have described but a few specific examples of our inventive concept and a few results of tests thereon, we consider the invention not to be limited thereto and that suitable changes, variations and modifications may be made without departing from the spirit and scope of the invention.

We claim:
1. In a method of filtering and washing substantially pure finely-divided synthetic hydrous oxides capable of adsorbing anionic materials, the step of adding from about 0.01% to about 0.5% on solids basis of a water-soluble polyelectrolyte having the structure, in acid form:

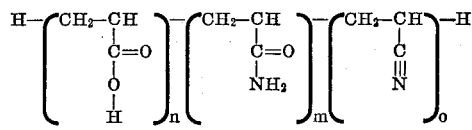

where $n$, $m$ and $o$ are whole numbers, and at least $n$ is greater than zero, and the groups within the parentheses may occur in random order and orientation, to a suspension of said finely-divided hydrous oxides to be adsorbed thereon to flocculate the same, said suspension being in the pH range of 4–10, whereby the resulting suspension possesses improved filtering and washing characteristics, filtering the suspension whereby a filter cake of increased permeability is obtained, and washing the resulting filter cake.

2. The process of claim 1 in which the polyelectrolyte consists essentially of polycarboxyethylene linkages.

3. A method of separating a substantially pure synthetic hydrous oxide capable of adsorbing anionic materials, said hydrous oxide being selected from the group consisting of alumina gel, silica-alumina gel, ferric oxide, and basic nickel carbonate, from an aqueous suspension of said hydrous oxide, within the pH range of 4–10, comprising the steps of adding to said suspension, under flocculating conditions, a water-soluble polyelectrolyte having the structure, in acid form:

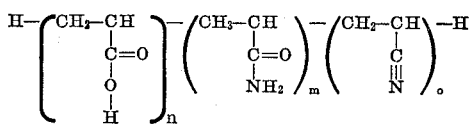

where $n$, $m$ and $o$ are whole numbers, and at least $n$ is greater than zero, and the groups within the parentheses may occur in random order and orientation, in an amount sufficient to flocculate and agglomerate said suspended oxide, and separating the flocculated and agglomerated oxide from the aqueous liquid.

4. The process of claim 3 in which the polyelectrolyte consists essentially of polycarboxyethylene linkages.

5. A method of filtering and washing a substantially pure synthetic hydrous oxide capable of adsorbing anionic materials, said hydrous oxide being selected from the group consisting of alumina gel, silica-alumina gel, ferric oxide, and basic nickel carbonate, from an aqueous suspension of said hydrous oxide within the pH range of 4–10, comprising the steps of adding to said suspension, under flocculating conditions, a water-soluble polyelectrolyte having the structure, in acid form:

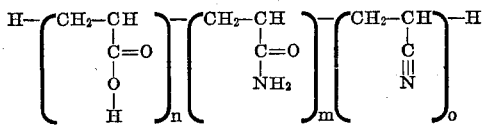

where $n$, $m$ and $o$ are whole numbers, and at least $n$ is greater than zero, and the groups within the parentheses may occur in random order and orientation, in an amount sufficient to flocculate and agglomerate said suspended oxide, and separating the flocculated and agglomerated oxide from the aqueous liquid.

6. The process of claim 5 in which the polyelectrolyte consists essentially of polycarboxyethylene linkages.

References Cited

UNITED STATES PATENTS

| | | | |
|---|---|---|---|
| 1,755,379 | 4/1930 | Banks | 260—822 |
| 2,149,748 | 3/1939 | Samuel. | |
| 2,351,259 | 6/1944 | Fuetterer | 210—54 XR |
| 2,625,529 | 1/1953 | Hedrick et al. | 210—24 |
| 2,728,725 | 12/1955 | Gloor | 210—54 XR |
| 2,981,630 | 4/1961 | Rowland | 210—54 XR |
| 2,995,512 | 8/1961 | Weidner et al. | 210—54 |

OTHER REFERENCES

Stein: "Water Purification Plants," John Wiley & Sons, N.Y., 1926, pp. 164, 165 and 170.

Soil Science: vol. 73, No. 6, June 1952, pp. 419 and 485–492.

Schweitzer: Rubber Chemistry and Technology, vol. 13, 1940, pp. 408–414.

MORRIS O. WOLK, Primary Examiner

U.S. Cl. X.R.

23—61, 143, 200; 252—455